United States Patent [19]

Lutz

[11] 4,311,331

[45] Jan. 19, 1982

[54] CLUTCH ASSEMBLY FOR DOOR LOCK SYSTEM

[75] Inventor: Manfred Lutz, Schweinfurt, Fed. Rep. of Germany

[73] Assignee: Fichtel & Sachs AG, Schweinfurt, Fed. Rep. of Germany

[21] Appl. No.: 53,507

[22] Filed: Jun. 28, 1979

[30] Foreign Application Priority Data

Jul. 7, 1978 [DE] Fed. Rep. of Germany ....... 2829925

[51] Int. Cl.[3] ....................... E05C 13/04; F16D 43/18

[52] U.S. Cl. .......................... 292/336.3; 192/105 CE; 292/201

[58] Field of Search ................. 192/105 CE, 105 CD, 192/103 B, 75, 76, 89 B, 89 W; 292/201, 336.3

[56] References Cited

U.S. PATENT DOCUMENTS

| | | | |
|---|---|---|---|
| 846,193 | 3/1907 | Fellows | 192/105 CD |
| 1,852,552 | 4/1932 | Altorfer | 192/105 CD |
| 1,978,834 | 10/1934 | Cotterman | 192/105 CE X |
| 2,057,389 | 10/1936 | Linder | 192/103 B X |
| 2,301,849 | 11/1942 | Bialy | 192/75 |
| 2,400,585 | 5/1946 | Wolff | 64/27 R X |
| 2,401,981 | 6/1946 | Springhorn | 192/105 CE |
| 3,255,855 | 6/1966 | Peras | 192/89 B X |
| 4,029,187 | 6/1977 | Davis et al. | 192/105 CE X |
| 4,093,289 | 6/1978 | Inabayashi et al. | 292/201 X |

*Primary Examiner*—Rodney H. Bonck

*Attorney, Agent, or Firm*—Toren, McGeady & Stanger

[57] ABSTRACT

A centrifugal clutch assembly particularly suited for a door lock system which utilizes a flywheel mass driven by an electric motor to move an actuating member of the locking system between a locked and an unlocked position is provided as part of the connecting means between the flywheel mass and the actuating member. The centrifugal clutch assembly is arranged to include a rotatably mounted carrier driven by the flywheel mass and carrying thereon centrifugal weights mounted for movement between a clutch-engaged position and a clutch-disengaged position. A restoring spring operates to restore the centrifugal weights to the clutch-disengaged position. The centrifugal weights include frictional pads defining first frictional engaging surfaces and a driven output member arranged in driving connection with the actuating member of the locking mechanism is formed to define second frictional engaging surfaces adapted to be frictionally engaged by the first frictional engaging surfaces. The friction pads defining the first frictional engaging surfaces are mounted upon the centrifugal weights by springs which act in a direction generally perpendicular to the frictional surfaces and stop members are provided for limiting movement of the centrifugal weights in a direction toward the clutch-engaged position in order to limit the maximum engaging force which is applied between the first and second frictional engaging surfaces.

17 Claims, 5 Drawing Figures

CLUTCH ASSEMBLY FOR DOOR LOCK SYSTEM

BACKGROUND OF THE INVENTION

The present invention relates generally to door locking systems and more particularly to a system for the doors, hoods or covers of vehicles such as automobiles.

The invention is specifically related to the overall structure and arrangement of a centrifugal clutch assembly which is particularly adapted for utilization with a locking system wherein a flywheel mass is driven by an electric motor to actuate an actuator member of the door closing system. A gearing connection is provided between the flywheel mass and the actuator member and the centrifugal clutch of the present invention is specifically intended for use as part of this gearing connection.

Generally, a clutch mechanism of the type to which the present invention relates will include a rotatably mounted carrier member which is arranged in driving connection with the flywheel mass. Centrifugal weight means will be movably mounted upon the carrier member and a spring will be utilized for applying a restoring force to the centrifugal weights to return them to the clutch-disengaged position. The friction surfaces of the clutch are defined on the centrifugal weight and also upon an output or driven member of the clutch which is placed into driven connection with the friction surfaces on the centrifugal weights in order to impart driving force to the actuator of the door locking system.

A locking system of the type with which the present invention may be utilized is described in application Ser. No. 902,346 filed May 3, 1978, assigned to the same assignee as the present application the disclosure of which is incorporated herein by reference.

The present invention is directed toward providing a locking system of the type mentioned which is constructed so that manual actuation and control of the locking system independently of the electric motor drive may be readily effected. With the invention, provision is made for transmission of only a limited amount of torque by the centrifugal clutch of the invention so that in the case of impediments or malfunctions of any kind, elevated or extreme loads will not be transmitted by the system.

SUMMARY OF THE INVENTION

Briefly, the present invention may be described as a centrifugal clutch assembly particularly adapted for use in a door locking system, especially suitable for motor vehicles, including a flywheel mass driven by electric motor means, an actuating member of the locking system driven by the flywheel mass and connecting means including as a part thereof the centrifugal clutch assembly of the invention, the connecting means being operatively interposed between the flywheel mass and the actuator member, the centrifugal clutch means of the invention comprising rotatably mounted carrier means arranged in driving engagement with the flywheel mass, centrifugal weight means mounted on the carrier means for movement between a clutch-engaged and clutch-disengaged position, restoring spring means for restoring the centrifugal weight means to the clutch-disengaged position, first frictional engaging means mounted on the centrifugal weight means, driven output means arranged in driving connection with the actuating member of the locking system and including second frictional engaging means adapted to be frictionally engaged by the first frictional engaging means, resilient means supporting the first frictional engaging means on the centrifugal weight means and applying thereto a spring force tending to urge said first frictional engaging means into engagement with said second frictional engaging means when the centrifugal weight means are in the clutch-engaged position and stop means for limiting movement of the centrifugal weight means in a direction toward the clutch-engaged position thereby to limit the centrifugal force which may be applied to the frictional engaging means.

Thus, in accordance with the improvement of the present invention, the frictional surface of the first frictional engaging means which are mounted on the centrifugal weight means will be elastically supported in a direction substantially perpendicular to the frictional surface of the centrifugal weight and the centrifugal weight carrier will engage a stop member which is provided in order to limit the movement of the centrifugal weight in the engaging direction of the clutch after the clutch frictional engaging surfaces have come into contact and while the spring suspension of the first frictional engaging means is in the loaded condition.

In accordance with a further aspect of the invention, the first frictional engaging means may be formed as friction pads supported by spring means on the centrifugal weight means. This embodiment is preferred over an alternative possibility wherein the friction pad body is exclusively elastic in itself.

In order to create by the spring suspension of the invention a well defined contact force between the frictional surface of the friction pads and the engagement surface of the driven member, which contact force will be largely independent of variation of spring constants and wear of the frictional surfaces, it is desirable to maintain the spring suspension under an initial tension at the centrifugal weight means.

A particularly simple and reliable form for the spring suspension may consist in that the spring suspension is formed by a leaf spring which is attached at one end to the centrifugal weight means.

In order to obtain a sufficient length and hence a corresponding spring suspension characteristic without requiring expansion of the structural size of the centrifugal clutch, it is desirable that the leaf springs which are used extend substantially tangentially to the axis of rotation of the centrifugal weight carrier.

The initial tension may be easily created in the case of a leaf spring by arranging a leaf spring so that its other free end is in abutment with the centrifugal weight when the centrifugal weight is in its clutch disengaged position and so that it may be lifted off this abutment when the frictional engaging surface of the centrifugal weight is to be pressed against the frictional engaging surface of the driven member.

The friction pads may be guided at the centrifugal weight carrier in any desired manner so long as spring movement relative to the centrifugal weight is insured. Preferably, however, it may be provided that the frictional body is fastened on the leaf spring.

The centrifugal weight may be guided on the centrifugal weight carrier in any desired manner and the design will become especially simple and compact when the centrifugal weight is mounted on the centrifugal weight carrier about a pivot pin located outside the axis of rotation of the centrifugal weight carrier.

In a preferred embodiment, two centrifugal weights are mounted to be pivotable about one and the same pivot pin. A common restoring spring may then engage at both centrifugal weights.

This restoring spring may be designed as a graduated ring spring which engages by both its ends at each of the centrifugal weights.

An especially simple form of the clutch will result when the centrifugal weight is pivotably mounted at the centrifugal weight carrier about a pivot axis parallel to the axis of rotation of the centrifugal weight carrier.

The stop limiting member which limits movement of the centrifugal weights may be arranged, in accordance with a particularly simple structural feature of the invention, opposite a radially outer limiting surface of the centrifugal weight. This stop member may then be formed in a single piece with the centrifugal weight carrier.

The flywheel mass may be formed in part by the rotor of an electric motor and in part by the masses of the gear connection. Alternatively, under the invention the centrifugal weight carrier itself and the centrifugal weight driven by the latter may be utilized as an essential part of the flywheel mass.

In particular, when the centrifugal weight is mounted about a pivot axis parallel to the axis of rotation of the centrifugal weight carrier, the output part of the centrifugal clutch may be formed with a cupped or pot-shaped configuration and it may enclose the centrifugal weight carrier having the centrifugal weights mounted thereon.

In view of the particularly simple design of the gearing connection, it is further proposed that the output part of the centrifugal clutch be connected with a pinion and that this pinion be in engagement with a rack which in turn is connected with the actuator member of the locking mechanism.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENT

Figure 1:
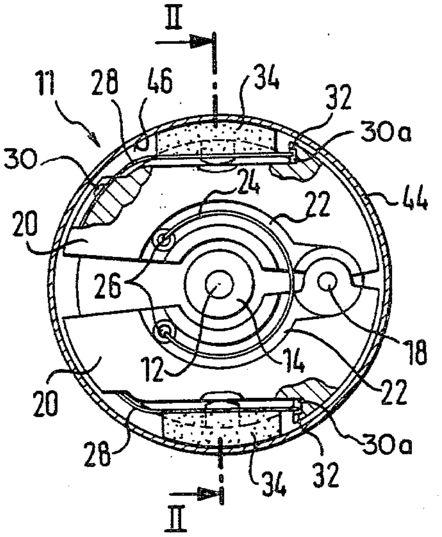
FIG. 1 is an end view of a centrifugal clutch assembly in accordance with the invention, shown partly broken away and partly in section, with the clutch being in the engaged state.
Figure 2:
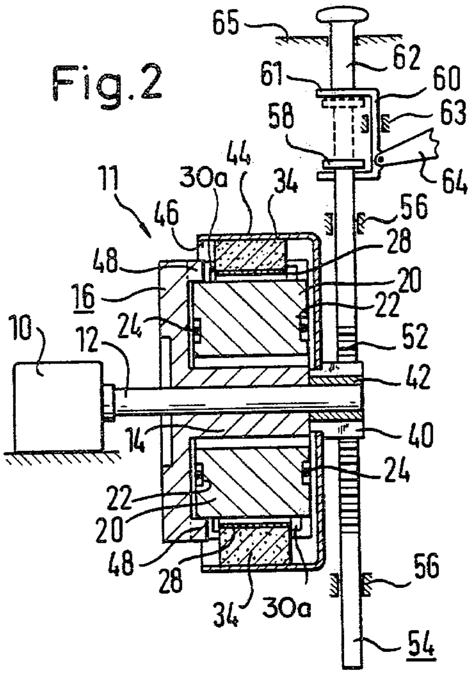
FIG. 2 is a sectional view taken along the line II—II of FIG. 1.

Referring now to the drawings wherein like reference numerals designate similar parts throughout the various figures thereof, and with specific reference particularly to FIGS. 1 and 2, there is shown an electric motor 10 having an output shaft 12 upon which there is fixedly mounted a hub 14 of a centrifugal weight carrier 16. The carrier member 16 carries a pivot pin 18 about which two crescent-shaped centrifugal weights 20 are pivotally mounted. Within annular recesses 22 of the centrifugal weights 20 there are arranged annular springs 24 which engage by their bent ends within bores 26 of the centrifugal weights and which apply a spring force tending to hold the centrifugal weights in the clutch-disengaged position shown in FIGS. 3 and 4, in which position the crescent shaped centrifugal weights 20 abut with their inner contours against the hub 14 of the centrifugal weight carrier member 16.

Upon each of these centrifugal weights 20 there is provided at leaf spring 28, with the springs 28 being fastened upon the associated centrifugal weights 20 by a rivet 30 provided for each. At the other end of each of the leaf springs 20 there is provided a pocket 30*a* within which each of the spring ends engages for each of the respective centrifugal weights 20. The radially outer limiting surfaces 32 of each pocket will form an abutment for the free end of the leaf spring 28 against which the leaf spring abuts in the inoperative or clutch-disengaged position shown in FIGS. 3 and 4, with the centrifugal weights 20 being under initial spring tension.

Fastened on the leaf springs 28 are frictional pads or bodies 34. The frictional pads 34 comprise or define first frictional engaging surfaces 38.

Upon the output shaft 12 of the electric motor 10 there is rotatably mounted by means of a bearing 42 a pinion 40. On the pinion 40 there is provided a cupped output or driven member 44 which is arranged in fixed rotative engagement with the pinion 40. The cupped portion of the driven member 44 defines second frictional engaging surfaces 46 which are engaged by the first frictional engaging surfaces 38 defined by the friction pads 34.

Upon the centrifugal weight carrier 16 there is provided for each centrifugal weight 20 a stop member 48 which is located opposite the radially outer limiting surface 50 of the respective centrifugal weight 20.

Pinion 40 meshes with a rack 52 of an actuator 54 which is displaceably guided in guideways 56 and which comprises an engaging head 58. The engaging head 58 engages a U-shaped carrier 60 of a manual actuating knob 62, as is normally provided for the lock system of a door closing mechanism for a motor vehicle. The U-shaped carrier 60 is connected with the door closing mechanism through a pivot lever 64.

In FIG. 2, the pivot lever 64 is shown in its lowered position which corresponds to the locked state of the door mechanism.

The pivot lever 64 is arranged so that it may be pivoted upwardly either by a motor or by manual operation.

In order to effect upward pivoting of the lever 64 by operation of the electric motor, the motor 10 may be caused to start and to operate in a first direction of rotation. The pinion 40, which is rotatably mounted on the output shaft 12, does not at first rotate with rotation of the motor 10 and thus no driving energy is imparted to the actuator 54. Accordingly, during initial starting operation of the motor 10, the actuator 54 remains stationary.

With increasing acceleration of the output shaft 12 and hence with increasing acceleration of the carrier member 16, the centrifugal weights 20 will have an increasing centrifugal force applied thereto. As soon as this centrifugal force exceeds the initial tension of the annular spring 24, the centrifugal weights will move in a radially outward direction being pivoted about the pin 18 upon which they are mounted.

With further increasing speed of rotation and hence with increasing centrifugal force applied to the weights 20, the frictional surfaces 38 of the friction pads 34 will make contact with the frictional engaging surface 46 of the output or driven member 44 so that the member 44 will be driven by the engaging condition which is established. As a result, the pinion 40 which is fixedly mounted to rotate with the driven member 44 will begin to displace the rack 52 and hence the actuator member 54 will be driven upwardly.

As the speed of rotation of the shaft 12 further increases, thus increasing the centrifugal force developed, the leaf springs 28 will be lifted at their free ends from the abutments 32 due to the outward movement of the weights 20.

Finally, the centrifugal weights 20 will make contact at their outer surfaces 50 against the stop members 48 so that despite further increases in the speed of rotation and further increasing centrifugal force the weights will not be moved radially outwardly beyond the limits established by the stop members 48. The contact force which is thus established between the friction pads 34 and the frictional engaging surface 46 will have thus reached its maximum value and it will not increase beyond this value. This contact force will be dependent upon the spring constant and also upon the initial tension of the leaf springs 28. These leaf springs 28 therefore will determine the maximum torque which can be transmitted by the centrifugal clutch of the assembly, which is generally designated by the reference numeral 11 in the drawings.

When the actuator 54 is raised upwardly by the pinion 40, the engaging head 58 of the actuator 54 will ultimately make contact with the upper leg 61 of the U-shaped carrier 60 so that the carrier 60 will be raised upwardly in its guideways 63 as a result of which the safety knob 62 is lifted relative to the door trim 65. At the same time, the pivot lever 64 is pivoted upwardly thereby releasing the door closing mechanism (not shown).

Even if there occurs some malfunction or impediment anywhere in the mechanism of the system disclosed, damage or destruction of the gear connection established between the electric motor 10 and the pivot lever 64 will not occur because the maximum transmittable torque capable of being passed through the centrifugal clutch 11 will be dimensioned to a degree established by the selection of the springs 28.

Figure 3:
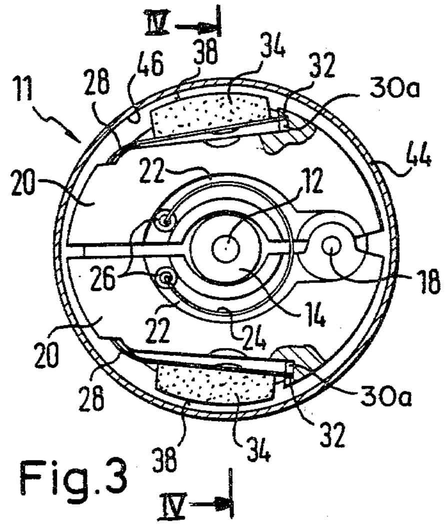
FIG. 3 is an end view corresponding to that of FIG. 1 showing the clutch in the disengaged state.
Figure 4:
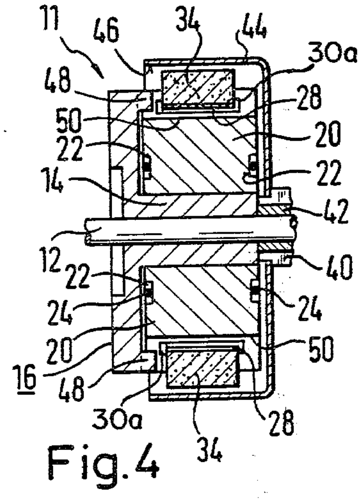
FIG. 4 is a sectional view taken along the line IV—IV of FIG. 3.

If the safety knob 62 is to be pulled upwardly in a manual operation, the motor 10 will be stationary and the centrifugal clutch 11 will be in the disengaged position as depicted in FIGS. 3 and 4. The actuator 54 will then be lifted upwardly with rotation of the pinion 40 and of the cupped member 44 with little effort and without the necessity for simultaneous rotation either of the centrifugal weight carrier 16 or of the motor 10.

If the actuator 54 is to be shifted downwardly from its position shown in broken line form in FIG. 2, it will be sufficient to reverse the direction of rotation of the motor 10 with the centrifugal clutch then behaving in the manner described above to effect locking of the door closing mechanism.

Figure 5:
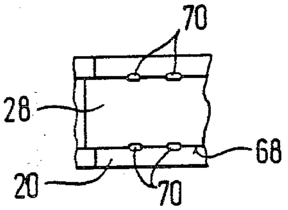
FIG. 5 is a detailed view of an attachment of a leaf spring to the centrifugal weight of the clutch.

FIG. 5 shows a variation of a part of the invention related to the attachment of the leaf spring 28. In FIG. 5, the leaf spring 28 is placed in a groove 68 at the outer circumference of the centrifugal weight 20 and it is fixed at several points 70 by wedging of the groove edge.

While specific embodiments of the invention have been shown and described in detail to illustrate the application of the inventive principles, it will be understood that the invention may be embodied otherwise without departing from such principles.

What is claimed is:

1. In a door lock system especially for motor vehicles including a flywheel mass driven by electric motor means, an actuating member driven by said flywheel mass and connecting means including centrifugal clutch means operatively interposed between said flywheel mass and said actuating member, the improvement wherein said centrifugal clutch means comprise: centrifugal weight means mounted on carrier means for movement between a clutch-engaged position and a clutch-disengaged position; restoring spring means for restoring said centrifugal weight means to said clutch-disengaged position; first frictional engaging means mounted on said centrifugal weight means; driven output means arranged in driving connection with said actuating member and including second frictional engaging means adapted to be frictionally engaged with said first frictional engaging means; resilient means supporting said first frictional engaging means on said centrifugal weight means; and stop means for limiting movement of said centrifugal weight means in a direction toward said clutch-engaged position; said first frictional engaging means comprising friction pads defining frictional engaging surfaces thereon, said frictional pads being supported by said resilient means at said centrifugal weight means; said resilient means comprising spring means held under an initial spring tension at said centrifugal weight means; said spring means comprising a leaf spring fastened at one end to said centrifugal weight means; said leaf spring having its other end free and movable and held against an abutment surface when said centrifugal weight means is in its clutch-disengaged position, said leaf spring being arranged to be lifted off said abutment surface when said first frictional engaging means is in engagement with said second frictional engaging means.

2. A system according to claim 1 wherein said resilient means operate to apply a spring force tending to urge said first frictional engaging means toward said second frictional engaging means when said centrifugal weight means is in said clutch-engaged position.

3. A system according to claim 1 wherein said stop means are located to limit movement of said centrifugal weight means in said direction toward said clutch-engaged position at a point at which said resilient means will be operative to apply a spring force against said first frictional engaging means tending to urge said first frictional engaging means into engagement with said second frictional engaging means.

4. A system according to claim 1 wherein the maximum engaging force of said clutch is determined by the spring characteristics of said resilient means urging said first frictional engaging means into engagement with said second frictional engaging means.

5. A system according to claim 1 wherein said resilient means comprise a leaf spring and wherein said friction pads are fastened on said leaf spring.

6. A system according to claim 1 wherein said carrier means are mounted for rotation about an axis and wherein said centrifugal weight means are mounted on said carrier means for pivotal movement about a pivot pin located radially outwardly relative to said axis of rotation of said carrier means.

7. A system according to claim 6 wherein said centrifugal weight means comprise two centrifugal weights both mounted for pivotal movement about a common pivot pin.

8. A system according to claim 7 wherein said restoring spring means comprise a restoring spring which engages in common both said centrifugal weights.

9. A system according to claim 8 wherein said restoring spring is designed as a graduated ring spring having a pair of ends both of which engage said centrifugal weights.

10. A system according to claim 1 wherein said carrier means is mounted for rotation about an axis and wherein said centrifugal weight means are mounted on said carrier means for pivotal movement about a pivot axis parallel to said axis of rotation of said carrier means.

11. A system according to claim 10 wherein said leaf spring extends in a direction generally tangential to the axis of rotation of said rotatively mounted carrier means.

12. A system according to claim 10 wherein said stop means are located opposite radial outer limiting surfaces, respectively, of said centrifugal weights.

13. A system according to claim 1 wherein said stop means and said carrier means are formed together in a unitary arrangement.

14. A system according to claim 1 wherein said carrier means and said centrifugal weight means both form part of said flywheel mass.

15. A system according to claim 1 wherein said driven output means are formed as a cup-shaped member extending about both said centrifugal weight means and said carrier means.

16. A system according to claim 1 wherein said driven output means is connected with said actuating member by a pinion and a rack operatively engaged with each other.

17. In a door lock system especially for motor vehicles including a flywheel mass driven by electric motor means, an actuating member driven by said flywheel mass and connecting means including centrifugal clutch means operatively interposed between said flywheel mass and said actuating member, the improvement wherein said centrifugal clutch means comprise: centrifugal weight means mounted on carrier means for movement between a clutch-engaged position and a clutch-disengaged position; restoring spring means for restoring said centrifugal weight means to said clutch-disengaged position; first frictional engaging means mounted on said centrifugal weight means; driven output means arranged in driving connection with said actuating member and including second frictional engaging means adapted to be frictionally engaged with said first frictional engaging means when said centrifugal weight means are in said clutch-engaged position; resilient means supporting said first frictional engaging means on said centrifugal weight means; stop means for limiting movement of said centrifugal weight means in a direction toward said clutch-engaged position; and abutment means provided on said centrifugal weight means for holding said first frictional engaging means out of contact with said second frictional engaging means when said centrifugal weight means are in said clutch-disengaged position; said first frictional engaging means comprising friction pads defining frictional engaging surfaces thereon, said frictional pads being supported by said resilient means at said centrifugal weight means; said resilient means being held under an initial spring tension by said abutment means when said centrifugal weight means are in said clutch-disengaged position; said resilient means comprising a leaf spring fastened at one end to said centrifugal weight means; said leaf spring having its other end free and movable and held against an abutment surface when said centrifugal weight means is in its clutch-disengaged position, said leaf spring being arranged to be lifted off said abutment surface when said first frictional engaging means is in engagement with said second frictional engaging means.

* * * * *